United States Patent [19]

Bannai et al.

[11] Patent Number: 4,936,782
[45] Date of Patent: Jun. 26, 1990

[54] FLAT CABLE FOR STEERING DEVICE OF VEHICLE

[75] Inventors: Hiroyuki Bannai; Hironori Kato, both of Miyagi, Japan

[73] Assignee: Alps Electric Co., Ltd., Tokyo, Japan

[21] Appl. No.: 315,359

[22] Filed: Feb. 24, 1989

[30] Foreign Application Priority Data

May 23, 1988 [JP] Japan .............................. 63-66790[U]

[51] Int. Cl.⁵ .............................................. H01R 39/02
[52] U.S. Cl. ........................................ 439/15; 439/164
[58] Field of Search .................... 439/13, 15, 164, 474, 439/475

[56] References Cited

U.S. PATENT DOCUMENTS

| | | | |
|---|---|---|---|
| 4,502,746 | 3/1985 | Wawra et al. | 439/15 |
| 4,547,636 | 10/1985 | Mizuno et al. | 439/15 |
| 4,607,898 | 8/1986 | Reighard et al. | |
| 4,657,326 | 4/1987 | Zeller et al. | |
| 4,722,690 | 2/1988 | Priede | 439/15 |
| 4,744,763 | 5/1988 | Suzuki et al. | 439/164 |
| 4,797,109 | 1/1989 | Wende | 439/15 |
| 4,824,396 | 4/1989 | Sasaki et al. | 439/15 |

Primary Examiner—Gary F. Pauman
Attorney, Agent, or Firm—Guy W. Shoup; David W. Heid

[57] ABSTRACT

A cable reel is disclosed which includes a fixed member having an outer ring wall, a movable member having an inner ring wall and a ring member which couples the fixed member to the movable member in rotatable engagement. A belt-like cable is wound with a plurality of turns between the outer ring wall and the inner ring wall, and a cutter is provided on the fixed member at a position facing a folded portion of the cable, which is formed at an outer circumferential end portion of the cable, wherein when the movable member is rotated in a winding direction of the cable (to wind the cable on the inner ring wall) by a predetermined amount of more, the cable is cut by the cutter. A first connector is provided at the inner circumferential end of the cable for connecting the cable to a harness to permit connection to external equipment, and a first connector box is provided integrally with the movable member for fixedly receiving the first connector. A second connector is provided on the outer circumferential end of the cable to provide connection to external equipment via a harness. A pair of partition walls are provided, extending from the outer ring wall of the fixed member, to receive and secure the second connector in place near the outer ring wall. The fixed member is further provided with a cutout adjacent to the pair of partition walls to permit the harness connected to the second connector to exit the reel.

7 Claims, 6 Drawing Sheets

FLAT CABLE FOR STEERING DEVICE OF VEHICLE

BACKGROUND OF THE INVENTION

The present invention relates to a cable reel having a belt-like cable such as a flat cable utilized for electrical connection between a fixed member and a movable member.

FIGS. 6 and 7 are an exploded perspective view and a horizontal sectional view of a conventional cable reel, respectively.

Referring to FIGS. 6 and 7, reference numeral 1 designates a movable member having a central cylindrical portion 1a extending downwardly. A holder 2 forming an inner ring wall is fixed to the outer circumference of the cylindrical portion 1a. The holder 2 has an axial slit 2a. Reference numeral 3 designates a flat cable formed by laminating a plurality of conductors between a pair of base films. The flat cable 3 is wound with a plurality of turns. An inner circumferential end portion of the flat cable 3 is inserted through the slit 2a, and is folded at right angles between the holder 2 and the cylindrical portion 1a, then led through a cable leading member 4 fixed to the movable member 1 to the outside of the cable reel. The inner circumferential end of the flat cable 3 is divided into two portions to which connectors 5a and 5b are mounted.

Reference numeral 6 designates a fixed member having a central hole 7. The fixed member 6 engages in a snap fashion with a lower end of the cylindrical portion 1a of the movable member 1. Thus, the movable member 1 is rotatably engaged with the fixed member 6. The fixed member 6 has at its outer circumference an outer ring wall 8. When the movable member 1 and the fixed member 6 are assembled, there is defined an annular space between the outer ring wall 8 of the fixed member 6 and the inner ring wall 2 of the movable member 1 for receiving the flat cable 3. A cable guide 9 projects obliquely downwardly from the outer ring wall 8 for guiding and leading an outer circumferential end portion of the flat cable 3 to the outside of the cable reel. A connector 10 is mounted to the outer circumferential end of the flat cable 3 led out of the cable reel.

A ring-like fixing member 11 is mounted on the upper end of the outer ring wall 8 so as to fix the outer circumferential end portion of the flat cable 3 to the fixed member 6. The fixing member 11 has a downward projection 12 for guiding the flat cable 3 in cooperation with the cable guide 9 of the fixed member 6 in such a manner that the flat cable 3 is sandwiched between the projection 12 and the cable guide 9. The fixing member 11 has a cutter 13 having a knife-like edge on the inner side of the projection 12. The outer circumferential end portion of the flat cable 3 is folded at a portion 3a at right angles, and a folded line of the portion 3a is positioned facing the knife-like edge of the cutter 13 as shown in FIG. 7. The cable 3 is then led out between the cable guide 9 and the projection 12.

The cable reel thus constructed is actually used in such a manner that the cylindrical portion 1a of the movable member 1 is inserted and fixed to a steering shaft as a rotating member of a steering device for an automobile, for example, and the fixed member 6 is mounted to a fixed member on a vehicle body. When the cable reel is mounted on the steering device, a steering wheel should be rotatable in opposite directions by substantially the same amount. This requirement can be met by providing a positioning mechanism between the movable member 1 and the fixed member 6 for properly positioning both members. The positioning mechanism comprises a gear 15 rotatably supported by a gear case 14 outwardly projecting from the outer ring wall 8 and a pair of projections 16 formed at the outer circumference of the movable member 1. When the movable member 1 is rotated 360 degrees, the projections 16 engage with the gear 15 to rotate the gear 15 by 90 degrees. Accordingly, by marking the gear case 14 and the gear 15 at suitable positions as an index, a relative position between the gear case 14 and the gear 15 may be made visible to thereby ensure proper positioning of the movable member 1 and the fixed member 6.

The operation of the above-described conventional cable reel is as set forth below.

In mounting the cable reel to the steering device, the movable member 1 and the fixed member 6 are properly positioned by using the positioning mechanism such that when the steering wheel is rotated in one direction, the flat cable 3 is wound around the inner ring wall 2 to a stroke end position; and when the steering wheel is rotated in the other direction, the flat cable 3 is unwound to the outer ring wall 8 until a stroke end position. In any case, the electrical connection between the movable member 1 (rotating part) and the fixed member 6 (fixed part) is maintained by the flat cable 3.

Even though the positioning mechanism is provided, there is a possibility that the cable reel will be erroneously mounted because an operator fails to notice the positioning marks, for example. If the cable reel is erroneously mounted in such a manner that the rotational amount of the movable member 1 in the unwinding direction of the flat cable 3 is too small, then when the steering wheel rotates movable member 1 in the unwinding direction by an amount greater than the predetermined unwinding amount, this results in the flat cable 3 being unwound and then rewound in the opposite direction, but the steering wheel is allowed to rotate. On the other hand, if the cable reel is erroneously mounted in such a manner that the available rotational amount of the movable member 1 in the winding direction of the flat cable 3 is too small, then when the steering wheel rotates movable member 1 in the winding direction by an amount equal to the available winding amount, the movable member 1, and correspondingly the steering wheel, are locked by the flat cable 3, and further rotation thereof is restrained. To cope with this problem, the flat cable 3 is forcibly cut by the cutter 13 by applying a tension to the flat cable 3 (see FIG. 7), thereby preventing the locking of the movable member 1 and the steering wheel.

However, in the conventional cable reel as described above, the ring-like fixing member 11 is secured to the outer ring wall 8 of the fixed member 6 by, for example, a snap engaging means (not shown) to hold the outer circumferential end portion of the flat cable 3 to the fixed member 6. In view of the structure required to perform the above-described task, fixing member 11 is complicated to produce and makes assembly of the reel difficult. In addition, the cable reel is enlarged in size by the provision of the fixing member 1.

SUMMARY OF THE INVENTION

Accordingly, it is an object of the present invention to provide a cable reel which is simpler in structure and more compact than the conventional reel.

According to the present invention, there is provided in a cable reel including a fixed member having an outer ring wall, a movable member having an inner ring wall and rotatably engaging said fixed member, a belt-like cable wound with a plurality of turns between said outer ring wall and said inner ring wall, and a cutter at a position facing a folded portion formed at an outer circumferential end portion of said cable, so that when said movable member is rotated in a winding direction of said cable by a predetermined amount or more, said cable is cut by said cutter. The present invention has an improvement wherein said cutter is provided on the fixed member in the vicinity of said outer ring wall; furthermore, a second connector is provided at an outer circumferential end of said cable for connecting said cable to a connection line to be connected to an external equipment, and said second connector is housed in a second connector receiving portion provided in the vicinity of said outer ring wall for fixedly receiving said first connector.

As mentioned above, the second connector is mounted to the outer circumferential end portion of the belt-like cable such as a flat cable, so as to electrically connect each conductor in the cable with a harness connected to the external connection line. Further, the cutter and the first connector receiving portion are placed in the vicinity of the outer ring wall of the fixed member, and the folded portion of the cable is engaged with the cutter, while the second connector is received in the second connector receiving portion, thus fixing the cable to the fixed member.

Other objects and features of the invention will be more fully understood from the following detailed description, the appended claims and the accompanying drawings.

DETAILED DESCRIPTION OF THE PREFERRED EMBODIMENT

Figure 1:
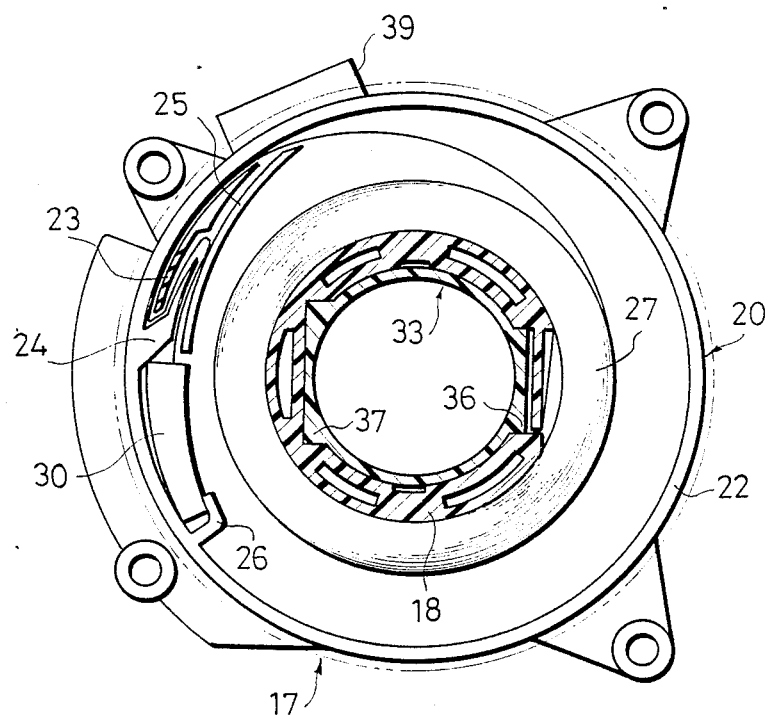
FIG. 1 is a partially sectional and partially plan view of the cable reel according to a preferred embodiment of the present invention.
Figure 2:
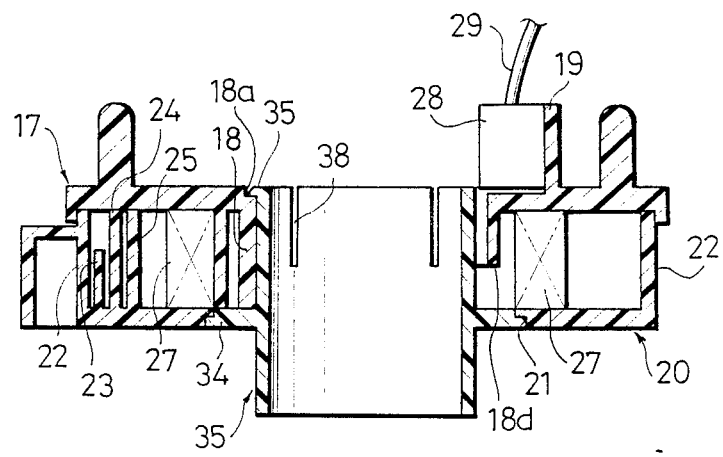
FIG. 2 is a vertical sectional view of the cable reel shown in FIG. 1.
Figure 3:
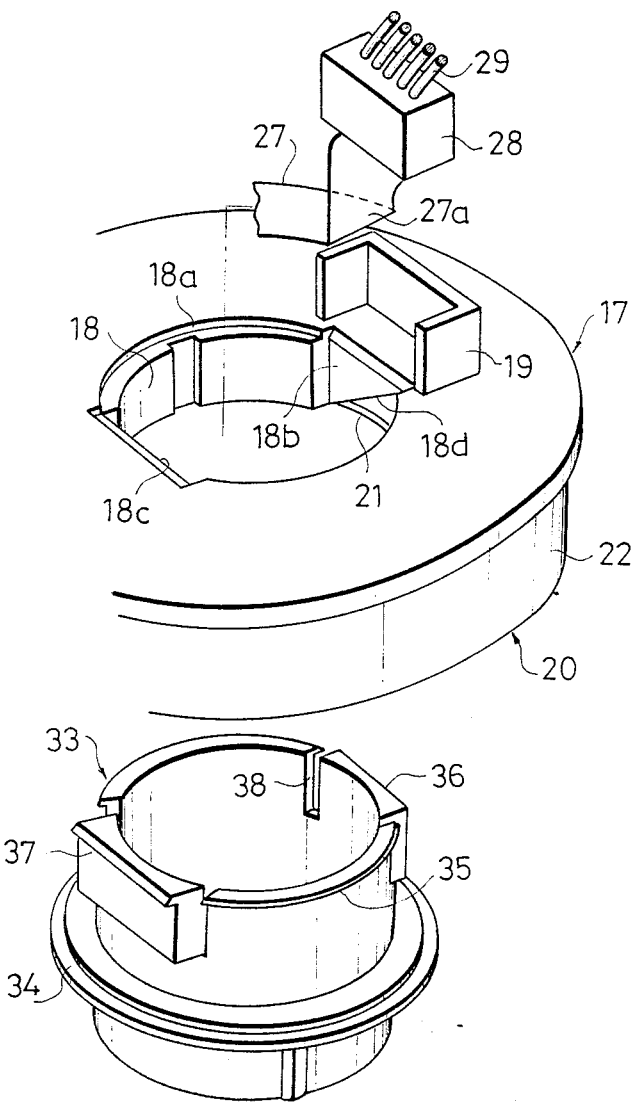
FIG. 3 is a perspective view of an inner circumferential fixing portion of the flat cable shown in FIG. 1.

Referring to FIGS. 1 to 5, a movable member 17 has a central cylindrical portion 18 extending downwardly and a connector box 19 upwardly projecting from a top portion of the movable member 17. It will be appreciated that connector box 19 has a U-shape as viewed in plan. The cylindrical portion 18 has at its upper end a pair of stepped portions 18a (only one of which is illustrated in FIG. 3) at opposite sides, and cylindrical portion 18 has at its inner circumferential wall a pair of recesses 18b and 18c opposed to each other, 180 degrees apart. The recess 18b has a tapering cutout 18d.

A fixed member 20 has a central hole 21 and an outer ring wall 22 upwardly projecting at its outer circumference. The fixed member 20 includes a cutter 23 (FIGS. 1, 2, 4 and 5) upwardly projecting therefrom at a position inside of the outer ring wall 22, and further includes a first partition wall 24 (FIGS. 1, 2, and 4) and an inside wall 25 (FIGS. 1, 2, and 4) both upwardly projecting from the bottom of the fixed member 20. The walls 24 and 25 are located inward from the cutter 23. The fixed member 20 also includes a second partition wall 26 (FIG. 1) upwardly projecting from the bottom of the fixed member 20 near the outer ring wall 22, at a predetermined distance from the first partition wall 24. As shown in FIG. 5, the cutter 23 has a stepped knife-like edge comprised of teeth 23a.

Reference numeral 27 designates a flat cable formed by laminating a plurality of conductors between a pair of base films. The flat cable 27 is wound with a plurality of turns and is received in the annular space between the cylindrical portion 18 of the movable member 17 and the outer ring wall 22 of the fixed member 20. As shown in FIG. 3, the inner circumferential end portion of the flat cable 27 is folded at 27a to extend at right angles from the horizontal portion of the flat cable 27, and a first connector 28 is fixed to the end of the first folded portion 27a. The first connector 28 has a shape of rectangular prism, and each conductor of the flat cable 27 is connected to one end of each conductor of harness 29 in the first connector 28. Each conductor in harness 29 is connected at its other end to a connector (not shown) to be connected to external equipment. The first folded portion 27a is received in the cutout 18d of the cylindrical portion 18, and the first connector 28 is received in the connector box 19. Thus, the inner circumferential end portion of the flat cable 27 including the first connector 28 is fixed to the movable member 17 by a rotatable ring 33 (FIGS. 1 and 3) which will be hereinafter described.

Figure 4:
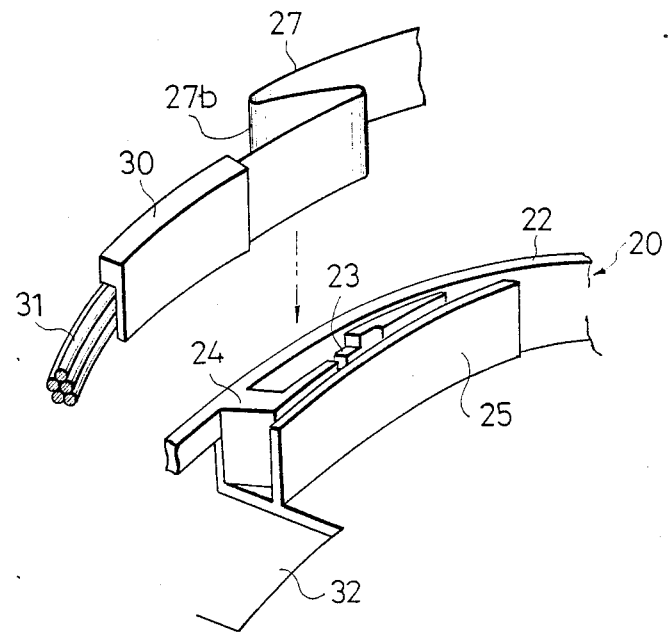
FIG. 4 is a perspective view of an outer circumferential fixing portion of the flat cable shown in FIG. 1.
Figure 5:
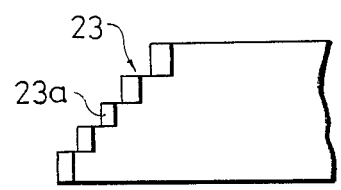
FIG. 5 is an elevational view of the cutter.
Figure 6:
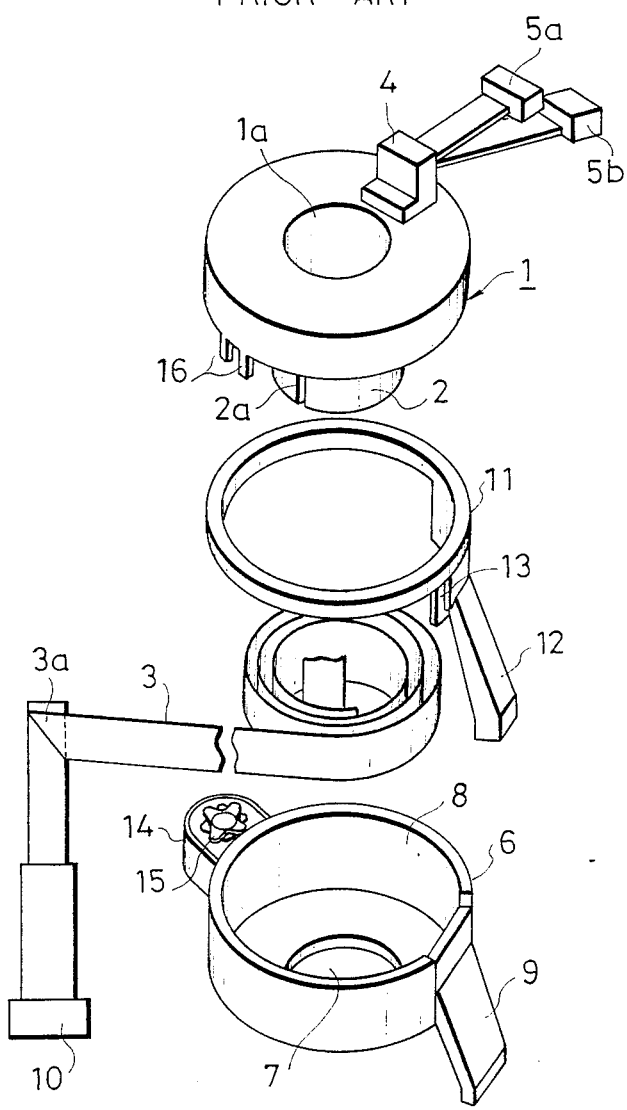
FIG. 6 is an exploded perspective view of the conventional cable reel.
Figure 7:
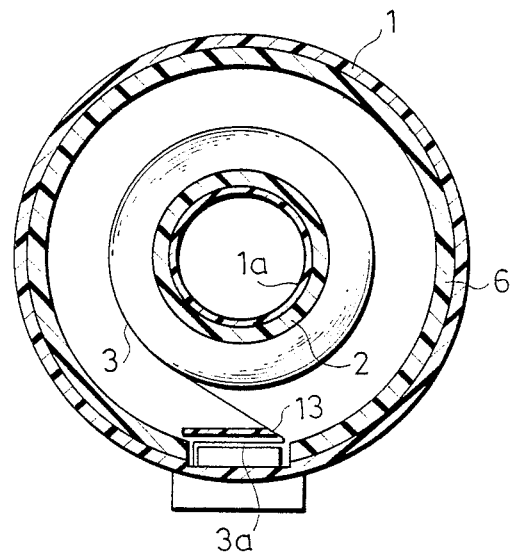
FIG. 7 is a horizontal sectional view of the cable reel shown in FIG. 6.

As shown in FIG. 4, an arcuate second connector 30 is fixed to the outer circumferential end of the flat cable 27, and each conductor of the flat cable 27 is connected to one end of each conductor in harness 31 in the second connector 30. Each conductor in harness 31 is connected at its other end to a connector (not shown) to be connected to an external equipment. The outer circumferential end portion of the flat cable 27 has a second folded portion 27b. The second folded portion 27b is inserted between the outer ring wall 22 and the inside wall 25 in such a manner that a folding line of the second folded portion 27b faces the teeth 23a of the cutter 23. The second connector 30 is fixedly received in an arcuate space by first and second partition walls 24 and 26, respectively, and the outer ring wall 22, thereby fixing the outer circumferential end portion of the flat cable 27 to the fixed member 20. Harness 31 is led out of the fixed member 20 through a cutout 32 (FIG. 4) formed at the bottom of the fixed member 20.

As shown in FIG. 2, the movable member 17 is rotatably connected to the fixed member 20 by the rotatable ring 33. The rotatable ring 33 has an annular flange 34 at a position just below the vertical center of the ring 33. Rotatable ring 33 also has at its upper end a pair of pawls 35 opposed to each other. Further, first and second projections 36 and 37, respectively, are located at the upper portion of the rotatable ring 33 at opposite positions 180 degrees apart. Axial slits 38 are located on the sides of each of the projections 36 and 37. The rotatable ring 33 is inserted through the central hole 21 of the fixed member 20 into the cylindrical portion 18 of the movable member 17, and the pawls 35 are fixedly engaged with the stepped portions 18a of the cylindrical portion 18, thereby fixing the rotatable ring 33 to the movable member 17. When so assembled, the projections 36 and 37 are received in the recesses 18b and 18c of the cylindrical portion 18, respectively, and the inner circumferential end portion of the flat cable 27 extends upwardly from the cutout 18d along the inner wall of the recess 18b and is sandwiched between the first projection 36 and the inner wall of the recess 18b to be thereby fixed to the movable member 17.

Reference numeral 39 shown in FIG. 1 designates a gear case projecting from the outer ring wall 22. The gear case 39 encases a gear (not shown) rotatably affixed to a shaft perpendicular to an axis of rotation of the movable member 17. Movable member 17 has at its outer circumference a projection (not shown) adapted to engage the gear. Thus, the gear case 39, the gear, and the projection of the movable member 17 comprise a positioning mechanism of the same kind as used in the conventional cable reel.

There will now be described the operation of the preferred embodiment as mentioned above.

In assembling the cable reel, the second connector 30 is first inserted between the partition walls 24 and 26, and the second folded portion 27b is inserted between the outer ring wall 22 and the inside wall 25, thus fixing the outer circumferential end portion of the flat cable 27 to the fixed member 20. Harness 31 is led out of the fixed member 20 through the cutout 32. Then, the movable member 17 is mounted on the fixed member 20. The first connector 28 is taken out of the cylindrical portion 18, and is inserted into the connector box 19. Then, the rotatable ring 33 is inserted through the central hole 21 of the fixed member 20 into the cylindrical portion 18 of the movable member 17. During the insertion, the pawls 35 of the rotatable ring 33 flex inwardly, which is permitted by vertical slits 38, and at the end of the insertion, the pawls 35 are fixedly engaged with the stepped portions 18a of the cylindrical portion 18. Thus, the movable member 17 and the rotatable ring 33 are rotatably engaged with the fixed member 20. In this assembled condition, the first folded portion 27a of the flat cable 27 is fixedly sandwiched between the rotatable ring 33 and the cylindrical portion 18, thus fixing the inner circumferential end portion of the flat cable 27 to the movable member 17. Further, a cover (not shown) may be mounted on the cutout 32 of the fixed member 20 as required, and an adhesive may be placed between the first connector 28 and the connector box 19 as required.

The cable reel thus assembled is mounted to the steering device with the movable member 17 and the fixed member 20 properly positioned by using the positioning mechanism. When the movable member 17 and the fixed member 20 are properly positioned, and the steering wheel is rotated in one direction, the flat cable 27 is wound around the outer circumferential surface of the cylindrical portion 18. Conversely, when the steering wheel is rotated in the other direction, the flat cable 27 is unwound to the outer ring wall 22.

In the event that the cable reel is erroneously mounted to the steering device, so that the rotational amount of the movable member 17 in the winding direction of the flat cable 27 is too small, then when the steering wheel is rotated in this direction by a predetermined amount or more, a large tension is applied to the flat cable 27 which urges the folding line of the second folded portion 27b against the teeth 23a of the cutter 23. As a result, the flat cable 27 is cut at the folding line by the cutter 23. Accordingly, by electrically detecting the conductive condition between the harnesses 29 led out of the movable member 17 and the harnesses 31 led out of the fixed member 20, the erroneous mounting of the cable reel can be found.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a cable reel including a fixed member having an outer ring wall, a movable member having an inner ring wall, said movable member rotatably coupled to said fixed member, a belt-like cable wound with a plurality of turns between said outer ring wall and said inner ring wall, and a cutter provided at a position facing a folded portion of said cable formed at an outer circumferential end portion of said cable, wherein when said movable member is rotated in a winding direction of said cable by a predetermined amount or more, said cable is cut by said cutter, the improvement comprising: forming said fixed member as a one-piece structure with said cutter being part of said fixed member and with said cutter being positioned in the vicinity of said outer ring wall.

2. The cable reel as claimed in claim 1, wherein said cutter includes a stepped knife-like edge with a plurality of teeth.

3. The cable reel as claimed in claim 1, further including a first connector provided at the inner circumferential end of said cable for connecting said cable to a harness to be connected to external equipment, and a first connector receiving portion provided on said movable member in the vicinity of said inner ring wall for fixedly receiving said first connector.

4. The cable reel as claimed in claim 3 further comprising a second connector connected to an outer circumferential end of said cable, and a second connector receiving portion included on said fixed member to fixedly receiving said second connector, wherein said second connector receiving portion comprises a pair of partition walls formed on an inside wall of said fixed member to define a space for fixedly receiving said second connector.

5. The cable reel as claimed in claim 3 further comprising a harness connected to said second connector, and a cutout formed through a bottom portion of said fixed member for leading said harness therethrough to the outside of said fixed member.

6. The cable reel as claimed in claim 2, further including a first connector provided at the inner circumferential end of said cable for connecting said cable to a harness to be connected to external equipment, and a first connector receiving portion provided on said movable member in the vicinity of said inner ring wall for fixedly receiving said first connector.

7. The cable reel of claim 1, wherein said cutter is formed integrally with said fixed member.

* * * * *

UNITED STATES PATENT AND TRADEMARK OFFICE
CERTIFICATE OF CORRECTION

PATENT NO. : 4,936,782

DATED : June 26, 1990

INVENTOR(S) : Hiroyuki Bannai et al.

It is certified that error appears in the above-identified patent and that said Letters Patent is hereby corrected as shown below:

Col. 6, line 45 - "to" should read --for--

Signed and Sealed this

Twenty-fifth Day of June, 1991

Attest:

*Attesting Officer*

HARRY F. MANBECK, JR.

*Commissioner of Patents and Trademarks*